United States Patent
Park et al.

(10) Patent No.: US 11,106,630 B2
(45) Date of Patent: Aug. 31, 2021

(54) HOST AND STORAGE SYSTEM FOR SECURELY DELETING FILES AND OPERATING METHOD OF THE HOST

(71) Applicant: Samsung Electronics Co., Ltd., Suwon-si (KR)

(72) Inventors: Jin-hwan Park, Yongin-si (KR); Chan-sol Kim, Hwaseong-si (KR); Myung-jin Jung, Yongin-si (KR); Ji-soo Kim, Gyeonggi-do (KR); Kyung-ho Kim, Seoul (KR); Pil-sung Kang, Hwaseong-si (KR); Bong-jun Choi, Hwaseong-si (KR); Chae-won Yu, Suwon-si (KR); So-jeong Lee, Hwaseong-si (KR)

(73) Assignee: Samsung Electronics Co., Ltd.

( * ) Notice: Subject to any disclaimer, the term of this patent is extended or adjusted under 35 U.S.C. 154(b) by 993 days.

(21) Appl. No.: 15/483,365

(22) Filed: Apr. 10, 2017

(65) Prior Publication Data

US 2018/0032541 A1 Feb. 1, 2018

(30) Foreign Application Priority Data

Jul. 26, 2016 (KR) .................. 10-2016-0094830

(51) Int. Cl.
*G06F 16/16* (2019.01)
*G06F 16/11* (2019.01)
*G06F 21/62* (2013.01)

(52) U.S. Cl.
CPC .......... *G06F 16/162* (2019.01); *G06F 16/122* (2019.01); *G06F 21/6209* (2013.01); *G06F 21/6218* (2013.01); *G06F 2221/2143* (2013.01)

(58) Field of Classification Search
CPC .. G06F 16/162; G06F 16/122; G06F 21/6218; G06F 21/6209; G06F 2221/2143
See application file for complete search history.

(56) References Cited

U.S. PATENT DOCUMENTS

| | | | | |
|---|---|---|---|---|
| 5,991,778 A * | 11/1999 | Starek | ................... | G06F 16/162 |
| 6,564,307 B1 * | 5/2003 | Micka | ..................... | G06F 21/62 |
| | | | | 711/103 |
| 8,370,602 B2 | 2/2013 | Chen et al. | | |
| 8,838,875 B2 * | 9/2014 | Park | ...................... | G06F 3/0652 |
| | | | | 711/103 |
| 8,909,888 B2 | 12/2014 | Goss et al. | | |
| 9,098,717 B2 * | 8/2015 | Kishi | ...................... | G06F 21/62 |
| 10,146,782 B1 * | 12/2018 | Bono | ...................... | G06F 16/11 |

(Continued)

FOREIGN PATENT DOCUMENTS

| | | |
|---|---|---|
| JP | 2007280330 | 10/2007 |
| JP | 2016012335 | 1/2016 |
| KR | 100876084 | 12/2008 |

*Primary Examiner* — Roboert W Beausoliel, Jr.
*Assistant Examiner* — Susan F Rayyan
(74) *Attorney, Agent, or Firm* — Onello & Mello, LLP

(57) ABSTRACT

An operating method of a host includes receiving a request for secure deletion of a first file stored in a storage system, providing an invalidation command to the storage system for invalidating data of the first file, providing an erase command to the storage system for erasing invalidated data included in the storage system, and performing a deletion operation, which is executable on an operating system of the host, on the first file which is deleted by the erase command.

20 Claims, 16 Drawing Sheets

(56) References Cited

U.S. PATENT DOCUMENTS

| | | | |
|---|---|---|---|
| 2006/0117136 A1* | 6/2006 | Tran | G06F 3/0623 |
| | | | 711/112 |
| 2008/0010326 A1* | 1/2008 | Carpenter | G06F 3/0623 |
| 2008/0195799 A1* | 8/2008 | Park | G06F 3/0652 |
| | | | 711/103 |
| 2008/0228827 A1* | 9/2008 | Perlman | G06F 21/6209 |
| 2008/0263271 A1* | 10/2008 | Kishi | G06F 21/62 |
| | | | 711/111 |
| 2011/0264884 A1 | 10/2011 | Kim | |
| 2013/0124785 A1* | 5/2013 | Xiong | G06F 12/0246 |
| | | | 711/103 |
| 2013/0254507 A1* | 9/2013 | Islam | G06F 21/6218 |
| | | | 711/166 |
| 2014/0006689 A1* | 1/2014 | Hashimoto | G06F 12/0246 |
| | | | 711/103 |
| 2014/0115709 A1* | 4/2014 | Gross | G06F 21/60 |
| | | | 726/26 |
| 2014/0280396 A1 | 9/2014 | Oh et al. | |
| 2015/0052292 A1 | 2/2015 | Mylly | |
| 2015/0186488 A1* | 7/2015 | Fischer | G06F 11/1471 |
| | | | 707/615 |
| 2016/0171241 A1* | 6/2016 | Yun | G06F 21/6245 |
| | | | 726/26 |
| 2016/0259583 A1 | 9/2016 | Kasa | |
| 2016/0300069 A1* | 10/2016 | Anil | G06F 21/62 |
| 2017/0220464 A1* | 8/2017 | Gallagher | G06F 11/1469 |

* cited by examiner

FIG. 13B

| LA | PA | Invalid |
|---|---|---|
| – | PA1 | Y |
| – | PA2 | Y |
| – | PA3 | Y |
| – | PA4 | Y |
| – | PA5 | Y |
| LA2 | PA6 | N |
| LA1 | PA7 | N |

History Table

HOST AND STORAGE SYSTEM FOR SECURELY DELETING FILES AND OPERATING METHOD OF THE HOST

CROSS-REFERENCE TO RELATED APPLICATION

This application claims priority under 35 U.S.C. § 119 from Korean Patent Application No. 10-2016-0094830, filed on Jul. 26, 2016, in the Korean Intellectual Property Office, the disclosure of which is hereby incorporated by reference in its entirety.

BACKGROUND

The inventive concepts relate to a host and a storage system. More particularly, the inventive concepts relate to the host and the storage system, which are capable of securely deleting files, and an operating method of the host.

A flash memory is a nonvolatile memory which is capable of retaining data stored therein even at power-off. Storage systems including flash memory, such as solid state drives (SSDs) or memory cards, are being widely used. For example, the storage systems are used to store or move a large amount of data.

As such storage systems are widely used in various fields, the security of data stored in a storage system is problematic. In particular, in a computing system in which a storage system is used, if information deleted by a user is recovered by others, critical information, such as personal information, secret documents, on-line certificates, or the like may be exposed.

SUMMARY

The inventive concepts provide a host and a storage system capable of securely deleting information a user wants to delete, and an operating method of the host.

In one aspect, the inventive concepts are directed to an operating method of a host, which includes receiving a request for secure deletion of a first file stored in a storage system, providing an invalidation command to the storage system for invalidating data of the first file, providing an erase command to the storage system for erasing invalidated data included in the storage system including the invalidated data of the first file, and performing a deletion operation, which is executable on an operating system of the host, on the first file which is erased by the erase command.

In another aspect, the inventive concepts are directed to an operating method of a host, which includes receiving a request to delete a first file included in a storage system through a secure deletion module supporting a secure deletion function, providing one of an unmap command and an overwrite command to the storage system in response to the request, for unmapping or overwriting data in the first file independently of an operating system installed in the host, and providing an erase command to the storage system for erasing data invalidated according to the one of the unmap command and the overwrite command. The erase command is provided to the storage system before an operation by the operating system deleting the first file starts.

In another aspect, the inventive concepts are directed to a host that accesses a storage system. The host includes a memory configured to store a secure deletion module including programs associated with secure deletion and a processor connected to the memory and configured to execute the programs stored in the memory. In response to a secure delete request on a first file, the processor erases the first file by providing the storage system with an invalidation command for invalidating data of the first file and an erase command for erasing the invalidated data of the first file, before an operation by the operating system deleting the first file starts.

In another aspect, the inventive concepts are directed to a storage system that communicates with a host. The storage system includes a memory device configured to store data and metadata of one or more files and a controller configured to control a data access operation of the memory device. The controller performs a first deletion operation on a first file under control of the host, the first deletion operation including invalidation of data of the first file and erasure of the invalid data of the first file. After the erasing of the invalid data of the first file is complete, the controller performs a second deletion operation on the first file under control of the host.

In another aspect, the inventive concepts are directed to an operating method of a host, which includes receiving a request for secure deletion of a first file stored in a storage system, providing an invalidation command to the storage system for invalidating data of the first file, providing an erase command to the storage system for erasing at least the invalidated data of the first file in the storage system, and, after the invalidated data of the first file is erased by the invalidation command and the erase command, performing a deletion operation, which is executable on an operating system of the host.

BRIEF DESCRIPTION OF THE DRAWINGS

These and/or other aspects and advantages of the present general inventive concepts will become apparent and more readily appreciated from the following description of the embodiments, taken in conjunction with the accompanying drawings of which:

FIG. 13A is a conceptual diagram and FIG. 13B is a table illustrating an example of an erase operation performed on invalid data in a storage system, according to some embodiments of the present inventive concepts;

DETAILED DESCRIPTION OF THE EMBODIMENTS

Figure 1:
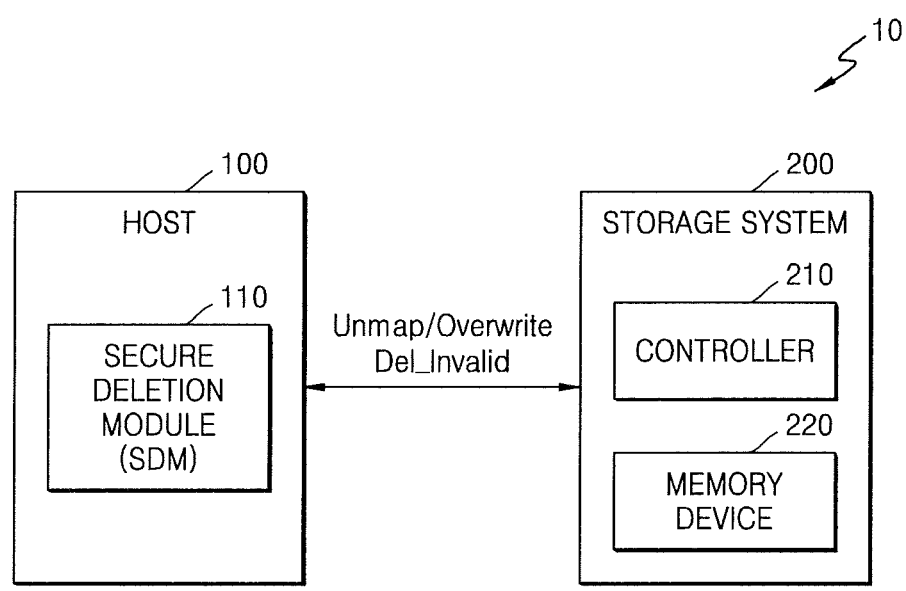
FIG. 1 is a block diagram illustrating a computing system according to some embodiments of the present inventive concepts.

Reference will now be made in detail to the embodiments of the present general inventive concepts, examples of which are illustrated in the accompanying drawings, wherein like reference numerals refer to the like elements throughout. The embodiments are described below in order to explain the present general inventive concepts by referring to the figures.

FIG. 1 is a block diagram illustrating a computing system according to some embodiments of the present inventive concepts.

Referring to FIG. 1, a computing system 10 may include a host 100 and a storage system 200. The storage system 200 may include a controller 210 and a memory device 220. According to some embodiments, the host 100 may include a secure deletion module (SDM) 110. The secure deletion module 110 may be implemented in various forms so as to be included in the host 100. For example, the secure deletion module 110 may be implemented with hardware (HW), which performs various processing operations associated with file deletion, such as a controller. In other embodiments, the secure deletion module 110 may be implemented by software (SW) including programs and may perform the various processes associated with the file deletion by executing, at a processor, the secure deletion module 110 loaded to a working memory. In other embodiments, the secure deletion module 110 may be implemented with a combination of HW and SW.

According to some embodiments, the secure deletion module 110 may be implemented by SW and may be stored in the computing system 10 in various ways. For example, the secure deletion module 110 may be nonvolatilely stored in the storage system 200 and may be provided from the storage system 200 to the host 100. In such an embodiment, the storage system 200 may correspond to a storage medium that stores the secure deletion module 110.

In another embodiment, the secure deletion module 110 may be nonvolatilely stored in any other storage device, which is placed outside the host 100 but in the computing system 10; if electric power is applied to the computing system 10, the secure deletion module 110 may be provided from the other storage device to the host 100. In other embodiments, a storage device may be included in the host 100, and the secure deletion module 110 may be nonvolatilely stored in the storage device of the host 100.

The host 100 may provide a data access request to the storage system 200. As an example, the host 100 may request the storage system 200 to read or write data. The storage system 200 may write data in the memory device 220 in response to an access request from the host 100. The storage system 200 may read data from the memory device 220 in response to the access request from the host 100 and may provide the read data to the host 100. In addition, in response to a data erase request from the host 100, the storage system 200 may erase data of a region that is indicated by the host 100.

The host 100 may communicate with the storage system 200 over various interfaces. The host 100 may include various kinds of devices that perform a data access operation on the storage system 200. For example, the host 100 may be an application processor (AP) that communicates with the flash memory-based storage system 200. According to some embodiments, the host 100 may communicate with the storage system 200 through various interfaces, such as a universal serial bus (USB), a multimedia card (MMC), PCIExpress (PCI-E), AT attachment (ATA), serial ATA (SATA), parallel ATA (PATA), a small computer system interface (SCSI), a serial attached SCSI (SAS), an enhanced small disk interface (ESDI), integrated drive electronics (IDE), or the like.

The storage system 200 may include one or more storage mediums. As an example, the storage system 200 may include one or more SSDs. In an embodiment in which the storage system 200 includes the SSD, the storage system 200 may include a plurality of memory chips. As an example, the storage system 200 may include a plurality of memory chips, for example, NAND memory chips, that nonvolatilely store data.

In other embodiments, the storage system 200 may correspond to a flash memory chip. In other embodiments, the storage system 200 may correspond to a memory card including one or more flash memory chips.

In an embodiment in which the storage system 200 includes a flash memory chip, the flash memory chip may include a two-dimensional (2D) NAND flash memory array or a three-dimensional (3D) (or vertical) NAND (VNAND) memory array. The 3D memory array is monolithically formed in one or more physical levels of arrays of memory cells having an active area disposed above a silicon substrate and circuitry associated with the operation of those memory cells, and such associated circuitry is above or within such substrate. The term "monolithic" means that layers of each level of the array are directly deposited on the layers of each underlying level of the array.

In some embodiments, the 3D memory array includes vertical NAND strings that are vertically oriented such that at least one memory cell is located over another memory cell. The at least one memory cell may include, for example, a charge trap layer.

The patent documents U.S. Pat. Nos. 7,679,133, 8,553, 466, 8,654,587, and 8,559,235, and US Pat. Pub. No. 2011/0233648, which are hereby incorporated by reference, describe suitable configurations for three-dimensional memory arrays, in which the 3D memory array is configured as a plurality of levels, with word lines and/or bit lines shared between levels.

Meanwhile, according to some embodiments, the secure deletion module 110 supports a function to securely delete a file, which the user of the storage system 200 selects, to such an extent that it is impossible to recover the selected file. For example, the secure deletion module 110 may be a software module that is installed in the host 100 and is executable by a processor (not illustrated). The secure deletion module 110 may be implemented by a separate host application and may be installed in the host 100. In other embodiments, the host 100 may include a device driver (not illustrated) for an interface with the storage system 200, and the secure deletion module 110 may be implemented in the device driver to perform various functions associated with the file deletion.

The user may select a file through the secure deletion module 110 installed in the host 100 and may request to delete the selected file. For example, in an embodiment in which the secure deletion module 110 is implemented in the form of a host application, the user may execute the host application to select a file, for example, a first file, needing secure deletion. If the first file is selected by the user, before an operation of deleting the first file is performed on an operating system (OS), the secure deletion module 110 may first perform at least one processing operation for deleting the first file securely.

The secure deletion module 110 may perform a processing operation for invalidating data, for example, user data, of the first file. As an example, the secure deletion module 110 may obtain information of a region at which the first file is located and may output an invalidation command for invalidating data corresponding to the obtained information of the region at which the first file is located. For example, the host 100 may manage logical addresses indicating logical storage locations of a plurality of files stored in the storage system 200 and may perform invalidation processing on data based on a logical address of the first file obtained in the host 100. For example, the secure deletion module 110 may output an unmap command Unmap for unmapping a region corresponding to the obtained logical address or may output an overwrite command Overwrite for overwriting random data in the region corresponding to the obtained logical address.

In response to a command from the secure deletion module 110, the storage system 200 performs an unmap or overwrite operation on the region corresponding to the obtained logical address. As such, data of the selected file, for example, the first file, may no longer be valid. In such an embodiment, the secure deletion module 110 may output an erase command Del_Invalid to the storage system 200 such that the invalid data of the first file does not remain in the storage system 200.

After the above-described file deleting operation is completely performed by the secure deletion module 110, the deletion of the first file may be performed on the OS of the host 100. As an example, when the deletion of the first file is completely performed, the secure deletion module 110 may provide the OS of the host 100 with information indicating that the deletion of the first file is completed. In other embodiments, after the deletion of the first file is completely performed, the secure deletion module 110 may provide the OS of the host 100 with a user request to delete the first file.

The host 100 may again perform an operation of deleting the first file on the OS. As an example, the host 100 may include a file system (not illustrated) that performs various management operations needed to store files in the storage system 200 and may manage data (or user data) of the plurality of files by using the file system. In addition, the file system included in the host 100 may generate metadata of each file and may store metadata of the first file in the storage system 200 together with the data of the first file.

The deletion of the first file on the OS may include various kinds of operations. In some embodiments, a flag included in metadata of the first file may be set to a logic value indicating a file deletion state. Furthermore, the deletion of the first file on the OS may include an unmap operation that is performed on a region at which the first file is located. The deletion of the first file on the OS may further include erasing data invalidated through the unmap operation. In the process of deleting a file on the OS, the above-described erase operation that is performed on invalid data may be automatically performed in the storage system 200.

According to the above-described embodiment, if file deletion is requested from the user, before the deletion of a file on the OS is performed, the secure deletion module 110 may perform a process of securely deleting the file independently of the OS. In an embodiment in which a file is deleted by the OS before the unmap operation is practically performed or before an erase operation is practically performed on invalid data by the secure deletion module, a time period in which data of the file to be deleted remains in the storage system 200 may exist. Also, even though data of a file to be deleted is invalidated by the OS, the recovery of the data of the file may be possible until invalid data is practically erased in the storage system 200. However, according to the above-described embodiment, since the secure deletion module 110 performs a series of operations for deleting a file independently of the OS, the file may be securely deleted at a time at which the user wants to delete the file. That is, according to embodiment in which the secure deletion module 110 performs a series of operations for deleting a file independently of the OS, a time period in which data of the file to be deleted remains in the storage system 200 does not exist.

Figure 2:
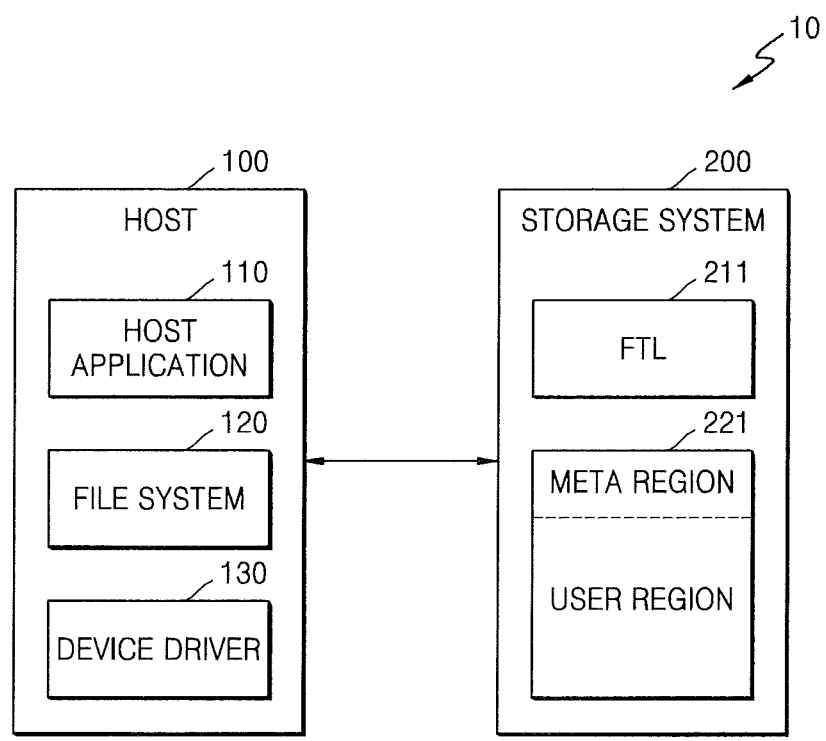
FIG. 2 is a block diagram illustrating implementation of the computing system illustrated in FIG. 1.

FIG. 2 is a block diagram illustrating implementation of the computing system 10 illustrated in FIG. 1.

Referring to FIG. 2, the OS may be installed, for example, in the host 100, and overall operations of the host 100 may be controlled by the OS. The host 100 may include, for example, a host application 110, a file system 120, and a device driver 130. The host application 110 may be installed in the host 100 for a specific purpose and may correspond to various kinds of applications capable of accessing the storage system 200. The device driver 130 may perform, for example, a function of controlling a data access to the storage system 200 by converting requests from the OS and/or the host application 110 into messages corresponding to the storage system 200.

According to some embodiments, the secure deletion module SDM may be implemented in the form of the host application 110 and may be installed in the host 100. In other embodiments, the secure deletion module SDM may be implemented in the device driver 130 in software and may execute a function to securely delete a file in response to a specific request through the OS. Hereinafter the secure deletion module SDM is implemented in the form of the host application 110, and, therefore, the host application 110 corresponds to the secure deletion module SDM.

The file system 120 may correspond to a system that manages files in the computing system 10 including the host 100 and the storage system 200. According to some embodiments, the file system 120 may be, for example, a portion of the OS or may be, for example, an additional program that supports systematic arrangement of files. In other embodiments, the file system 120 may include files stored in the storage system 200 and a structure of the files. The host 100 may access the storage system 200 based on various kinds of OSs and the file system 120. As an example, a file system such as a file allocation table (FAT) or a new technology file system (NTFS) file system of the Windows-based operating system or various file systems such as an Unix file system (UFS), Extended 2 (EXT2), Extended 3 (EXT3), and journaled file system (JFS) of the Unix/Linux-based operating system, or the like, may be used.

The storage system 200 may include, for example, one or more flash memory chips and may include a flash translation layer (hereinafter referred to as "FTL") 211 and a storage region 221. The FTL 211 may be a component included in the controller 210 in the embodiment illustrated in FIG. 1. The FTL 211 may include system software (or firmware) that manages write, read, and erase operations of the storage system 200. The FTL 211 may be loaded to a working memory (not illustrated) included in the storage system 200 and may be executed by a processor. According to some embodiments, the FTL 211 may include mapping information for translating a logical address into a physical address. The FTL 211 may receive a logical address indicating a file location in the host 100 and may translate the received logical address into a physical address indicating a physical location at which data is practically stored.

The file system 120 may generate metadata from data, for example, user data, that is provided from the user to generate a file. As an example, the metadata that includes various kinds of information for managing files may include information such as a file allocation table (FAT), a directory entry, and log information for recovery. According to some embodiments, the file system 120 may manage files in units of clusters.

A storage region 221 of the storage system 200 may include a meta region that stores the metadata and a user region that stores the user data. For example, on the basis of operations of the file system 120 and the FTL 211, user data of a first file may be stored in a user region, and metadata of the first file may be stored in a meta region. The file system 120 may manage a logical address of user data of the first file stored in the user region, and the logical address of the user data of the first file may be stored in the meta region as a portion of the metadata.

According to some embodiments, a user who wants to delete a file may provide the host application 110 with information of the file to be deleted together with a delete request. Before a process of deleting a file on the OS is performed, the host application 110 may perform one or more processing operations independently of the OS to securely delete the selected file. According to some embodiments, the host application 110 may output an unmap command Unmap (as seen in FIG. 1) and/or an overwrite command Overwrite (as seen in FIG. 1) to invalidate user data of the file. As the host application 110 outputs an erase command Del_Invalid (as seen in FIG. 1), invalid data in the storage system 200 may be erased.

According to some embodiments, the host application 110 may provide the unmap command Unmap to the storage system 200 together with a logical address indicating a logical storage location of user data of a file to be deleted. According to some embodiments, the unmap command Unmap and the logical address may be provided to the storage system 200 through the file system 120 and the device driver 130. The storage system 200 may invalidate the user data of the file by releasing a mapping relationship between the received logical address and a physical address corresponding to the logical address.

According to other embodiments, the host application 110 may provide the overwrite command Overwrite to the storage system 200 together with a logical address indicating a logical storage location of user data of a file to be deleted. According to some embodiments, random data may be overwritten on user data of a file to be deleted in response to the overwrite command Overwrite, and the random data may be provided from the host 100 to the storage system 200. The storage system 200 may read data from a region corresponding to a first physical address mapped to the received logical address and may overwrite random data on the read data. Furthermore, the overwritten data may be stored in a region corresponding to a second physical address. As such, mapping information may be changed such that the received logical address is mapped to the second physical address, and data previously stored at the first physical address may be invalidated.

According to other embodiments, user data of some files may be managed together with metadata without allocating separate logical addresses to the files. As an example, in an embodiment in which the size of user data of a specific file is smaller than a storage unit such as a cluster, the file system 120 may store user data in a region, in which metadata of the user data is to be stored, without allocating a separate logical address to the user data of the specific file. In such an embodiment, to invalidate the user data of the specific file, the host application 110 may provide a command for overwriting random data on the user data of the specific file to the storage system 200 through the file system 120. Since the file system 120 is capable of determining a region in which the user data of the specific file is stored, the user data of the specific file may be invalidated through the file system 120.

According to some embodiments, the host application 110 may selectively output the above-described unmap Unmap and overwrite commands Overwrite based on a specific condition. As an example, in the embodiment in which the host application 110 is capable of obtaining region information of the file, for example, a logical address at which a file to be deleted is located, the host application 110 may provide the storage system 200 with the unmap command Unmap to invalidate the region corresponding to the logical address. In contrast, in an embodiment in which the host application 110 is incapable of obtaining a logical address at which a file to be deleted is located from the file system 120, the host application 110 may provide the storage system 200 with the overwrite command Overwrite to invalidate user data.

Using the above-described operation of the host application 110, user data that a user wants to delete may be invalidated, and the host application 110 may provide the storage system 200 with an erase command Del_Invalid to erase the invalidated user data. According to some embodiments, the storage system 200 may erase invalid data of the selected file in response to the erase command Del_Invalid from the host application 110. Alternatively, according to another embodiment, in response to the erase command Del_Invalid from the host application 110, the storage system 200 may erase invalid data of a plurality of files stored therein or may erase all invalid data stored therein.

According to the above-described embodiment, when a processing operation for file secure deletion is completely performed by the host application 110, the host application 110 may transfer a file delete request from the user to the OS of the host 100. In response to the file delete request, the OS may process a file deleting operation executable on the OS including changing of metadata corresponding to the file, invalidating user data, or the like. The file deleting operation may be performed under control of the host application 110 before the file deleting operation by the OS is performed. For this reason, if an attempt to recover a file during the file deleting operation on the OS arises, the file may be securely deleted and, as a result, the file may not be recovered normally.

Figure 3:
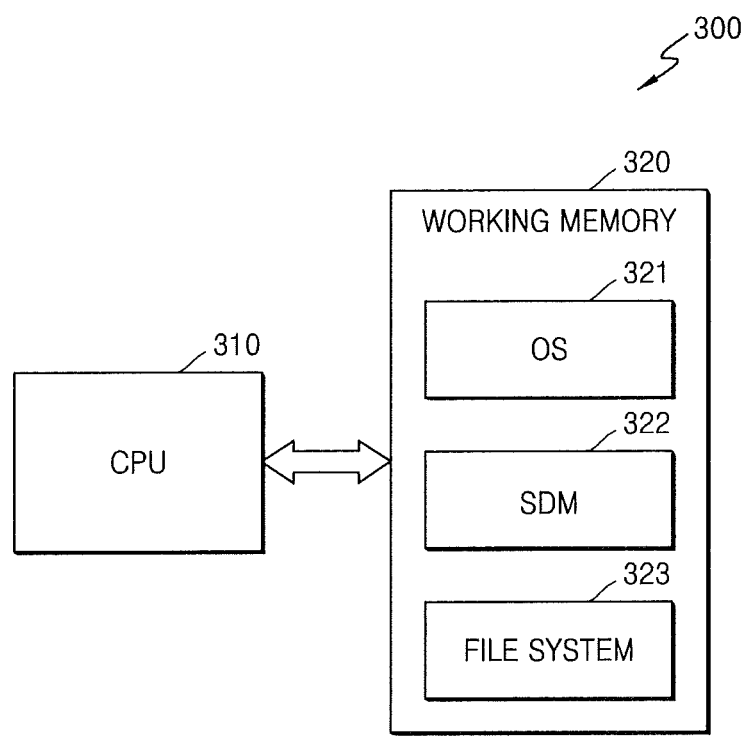
FIG. 3 is a block diagram illustrating a function of a secure deletion module implemented in software, according to some embodiments of the present inventive concepts.

FIG. 3 is a block diagram illustrating a function of a secure deletion module implemented in software, according to some embodiments of the present inventive concepts.

Referring to FIG. 3, a host 300 may include, for example, a central processing unit (CPU) 310 and a working memory 320. Software that includes various programs associated with a function of the host 300 may be loaded to the working memory 320. For example, programs such as an OS 321, a secure deletion module (SDM) 322, and a file system 323 may be loaded to the working memory 320. For example, the working memory 320 may be implemented with a RAM, a ROM, an electrically erasable programmable ROM (EEPROM), or a flash memory or by any other memory technology.

As described above in connection with FIGS. 1 and 2, the secure deletion module 322 may be separately installed in the host like a host application or may be implemented by a program that is executable in a device driver.

According to some embodiments, if the user requests file deletion on the OS 321, the OS 321 may delete a file on the OS 321 through processing such as changing metadata and invalidating data. According to other embodiments, if the user requests file deletion through the secure deletion module 322, the secure deletion module 322 may provide the above-described unmap or overwrite command Unmap/Overwrie to a storage system independently of the OS 321. Also, the secure deletion module 322 may provide the erase command Del_Invalid to erase invalid data to the storage system independently of the OS 321.

When the file deleting operation is completed under control of the secure deletion module 322, the secure deletion module 322 may transfer the file delete request from the user to the OS 321. The OS 321 may perform the file deleting operation thereon in response to the file delete request, after the file deleting operation is completed under the control of the secure deletion module 322.

Figure 4:
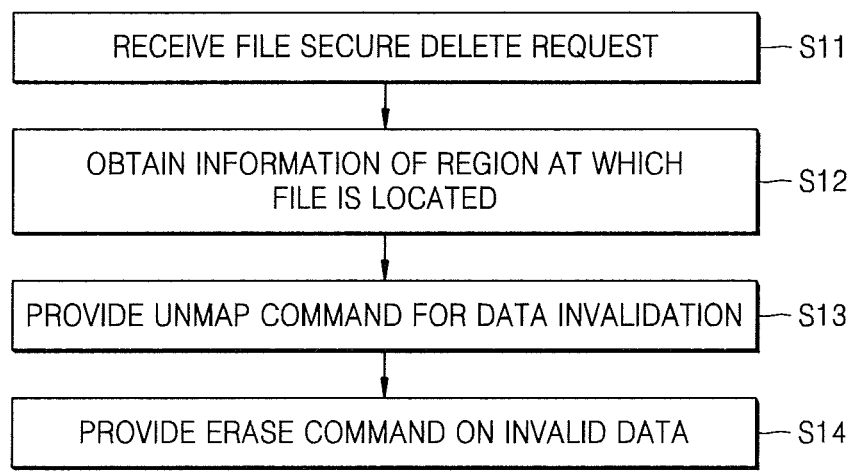
FIG. 4 is a flowchart illustrating an operating method of a host, according to some embodiments of the present inventive concepts.

FIG. 4 is a flowchart illustrating an operating method of a host, according to some embodiments of the present inventive concepts. Operations illustrated in FIG. 4 are described as being performed by a host. However, in more detail, at least some of the operations illustrated in FIG. 4 may correspond to an operation performed by a secure deletion module installed in the host. Also, in the following description, the term "data of a file" may correspond to user data. However, in some embodiments, the data of the file may be defined to include metadata and user data of the file.

The host may receive a file secure delete request of a specific file, for example, the first file, from the user (S11). For example, the user may execute a secure deletion module installed in the host, and the file secure delete request from the user may be provided to the secure deletion module. According to some embodiments, the user may provide a general file delete request on the OS. In such an embodiment, the above-described file secure delete request may correspond to a request different from a file delete request on the OS.

Information about a region at which the first file is located, may be obtained in the host (S12). For example, a logical address indicating a logical storage location of data of the first file may be obtained from a file system of the host as the region information. The host may provide a storage system with unmap command Unmap to invalidate data of the region corresponding to the logical address (S13). According to some embodiments, the host may provide the storage system with a logical address indicating a region at which data to be unmapped is located together with the unmap command through the file system. The storage system may invalidate the data of the first file by releasing a mapping relationship between the logical address and a physical address corresponding thereto in response to the unmap command.

When the unmap operation is completed, the host may provide the storage system with an erase command to erase invalid data (S14). According to some embodiments, the data of the first file may be invalidated by the above-described unmap operation, and the storage system may physically erase the invalid data in response to the erase command. For example, in an embodiment in which the storage system includes flash memory chips that erase data in units of cell blocks, the storage system may erase one or more cell blocks including invalid data of the first file.

After the file deleting operation of the secure deletion module included in the host, as illustrated in FIG. 4, is completed, the host may delete the first file on the OS. According to some embodiments, the secure deletion module may provide a request to delete the first file to the OS after automatically processing the file deleting operation in response to the secure delete request of the user associated with the first file.

Figure 5:
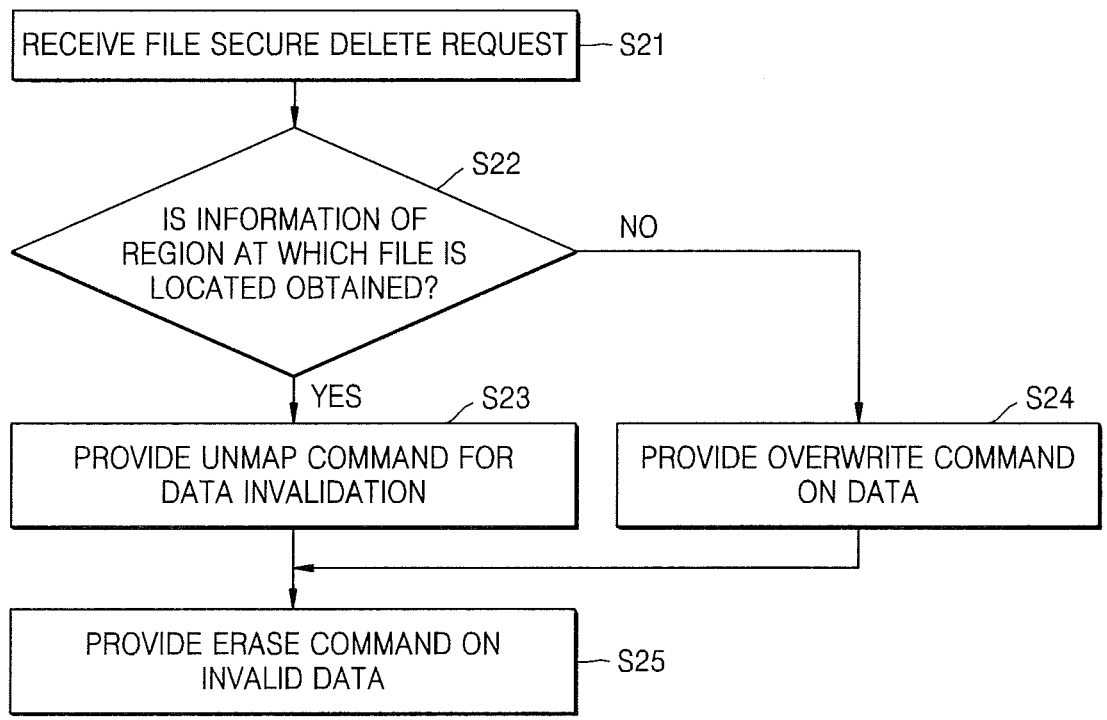
FIG. 5 is a flowchart illustrating an operating method of a host, according to some embodiments of the present inventive concepts.

FIG. 5 is a flowchart illustrating an operating method of a host, according to some embodiments of the present inventive concepts. Descriptions which are the same as those given with reference to FIG. 4 will not be repeated upon describing operations illustrated in FIG. 5.

Referring to FIG. 5, the host (or the secure deletion module) may receive a delete request of a user associated with a specific file, for example, the first file (S21). The host may determine whether it is possible to obtain information of a region at which the first file is located from a function block of a file system (S22).

If it is possible to obtain a logical address indicating a logical storage location of data of the first file from the file system, the host may provide a storage system with the obtained logical address together with the unmap command for invalidating the data of the first file in a manner that is the same as or similar to that described with reference to FIG. 4 (S23). When the unmap operation is completed, the host may provide the storage system with the erase command to erase invalid data (S25).

If it is not possible to obtain the logical address indicating the logical storage location of the data of the first file from the file system, the host may generate the overwrite command for invalidating the data of the first file (S24) and may provide the overwrite command to the storage system (S25). As an example, in an embodiment in which the data of the first file is managed together with metadata without allocating a separate logical address to the data of the first file, the host may provide the storage system with a command for overwriting dummy data on the data of the first file through the file system. The size of the dummy data may correspond to that of the data of the first file. The file system may determine a logical location in which the data of the first file is stored, and random data may be overwritten on the data of the first data under the control of the file system.

According to some embodiments, the data of the first file may be previously stored in a region corresponding to a first physical address, and a result of overwriting random data may be stored in a region corresponding to a second physical address. In such an embodiment, the overwritten data stored in the region corresponding to the second physical address may correspond to valid data. However, since the random data is overwritten on existing data, it is not possible to recover normal data of the first file. In addition, the data previously stored in a region corresponding to the first physical address may be processed as invalid data.

After the file deleting operation of the secure deletion module included in the host illustrated in FIG. 5 is completed, the host may delete the first file on the OS.

Figure 6:
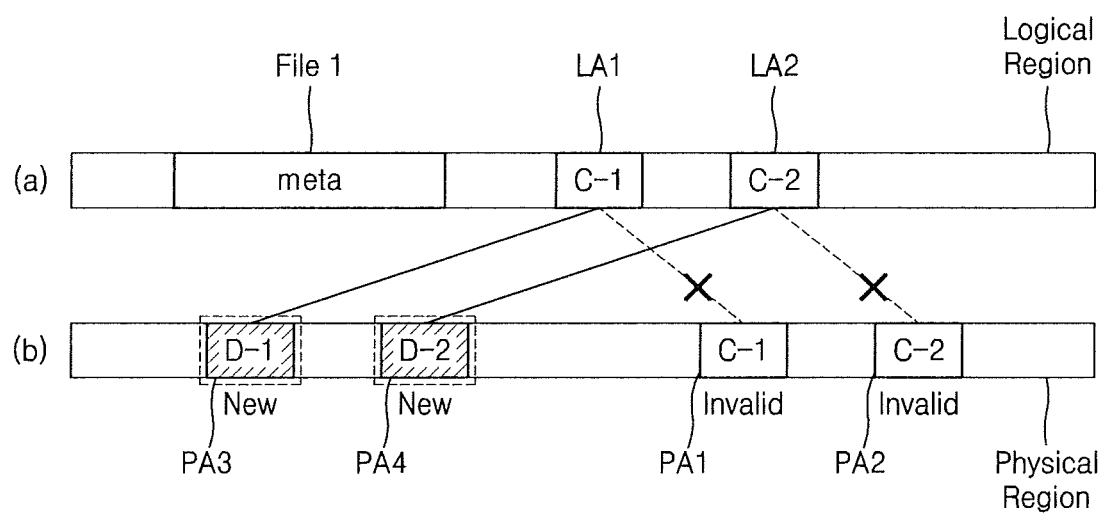
FIG. 6 and FIG. 7 are block diagrams illustrating an embodiment in which data is invalidated according to an unmap command and an example in which data is invalidated according to an overwrite command, respectively, according to some embodiments of the present inventive concepts.
Figure 7:
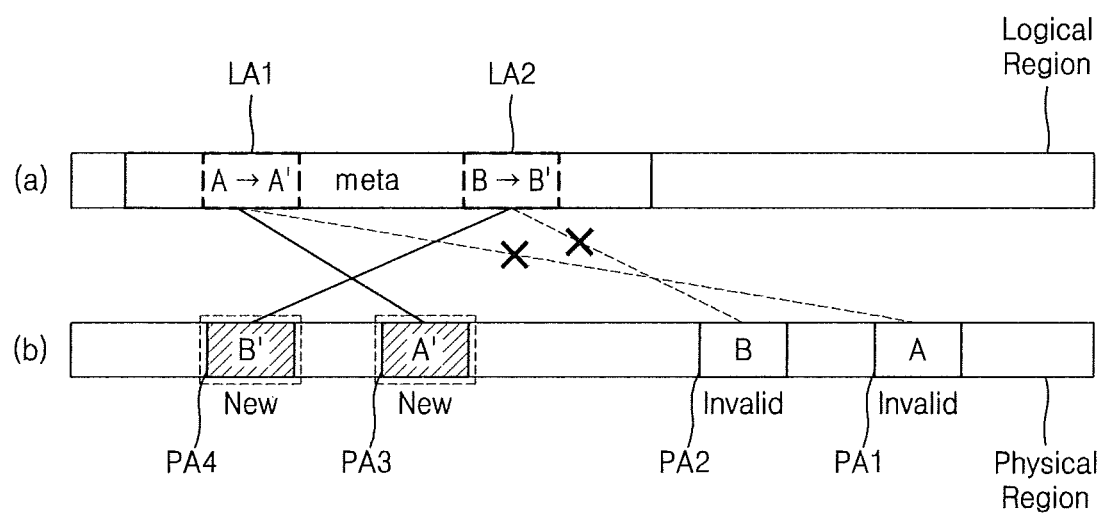

FIG. 6 and FIG. 7 are block diagrams illustrating an embodiment in which data is invalidated according to an unmap command and an embodiment in which data is invalidated according to an overwrite command, respectively. (a) in FIGS. 6 and 7 illustrate logical storage locations of files in a logical region managed by a host, and (b) in FIGS. 6 and 7 illustrate physical storage locations of files in a physical region managed by a storage system.

Referring to (a) and (b) of FIG. 6, in managing a first file File 1, a file system may manage the first file File 1 such that metadata "meta" of the first file File 1 is stored in a storage system and logical addresses LA1 and LA2 may be allocated for storing data C-1 and C-2 of the first file File 1 in the storage system. The secure deletion module according to some embodiments may obtain the logical addresses LA1 and LA2 as information of regions at which the data C-1 and C-2 of the first file File 1 are located through the file system. In the storage system, it is assumed that the logical addresses LA1 and LA2 are respectively mapped to physical addresses PA1 and PA2, as seen in (b) of FIG. 6.

In response to the unmap command from the secure deletion module, the storage system may release a mapping relationship between the logical addresses LA1 and LA2 and the physical addresses PA1 and PA2, respectively. As the mapping relationship is released, the data C-1 and C-2 previously stored at the physical addresses PA1 and PA2 may be processed as invalid data.

Alternatively, the storage system may newly map the logical addresses LA1 and LA2 to other physical addresses, for example, PA3 and PA4, respectively. Dummy data D-1 and D-2 that are not associated with the first file File 1 may be stored at the other physical addresses PA3 and PA4. As the mapping relationship between the logical addresses LA1 and LA2 and the existing physical addresses PA1 and PA2 is released, the data C-1 and C-2 previously stored at the physical addresses PA1 and PA2 may be processed as invalid data. Also, the dummy data D-1 and D-2 stored at the physical addresses PA3 and PA4 newly mapped to the logical addresses LA1 and LA2 may correspond to valid data but may be irrelevant to the first file File 1. For this reason, the data of the first file File 1 may not be recovered by using the dummy data D-1 and D-2.

Meanwhile, referring to (a) and (b) of FIG. 7, in the embodiment in which it is impossible to obtain a logical address as information of regions at which data "A" and "B" of the first file File 1 are located through the file system, the secure deletion module may issue an overwrite command instructing the storage system to overwrite random data on the data "A" and "B" of the first file File 1 through the file system. As an example, the file system may manage an operation of storing both the data "A" and "B" and metadata in the storage system without managing separate logical addresses of the data "A" and "B" of the first file File 1.

The overwrite command may be provided through the file system from the secure deletion module to the storage system. The file system may determine logical storage locations, for example, the logical addresses LA1 and LA2, of the data "A" and "B" of the first file File 1, and the storage system may overwrite random data on data stored at the physical addresses PA1 and PA2 mapped to the logical addresses LA1 and LA2. Data "A'" and "B'" on which the random data is overwritten may be stored in regions corresponding to physical addresses, for example, PA3 and PA4, different from the existing physical addresses PA1 and PA2. In such an embodiment, the data "A" and "B" stored at the existing physical addresses PA1 and PA2 may be processed as invalid data. Also, the overwritten data "A'" and "E" stored at the different physical addresses PA3 and PA4 may correspond to valid data but may be irrelevant to the first file File 1. For this reason, the data of the first file File 1 may not be recovered by using the overwritten data "A'" and "W'".

Figure 8:
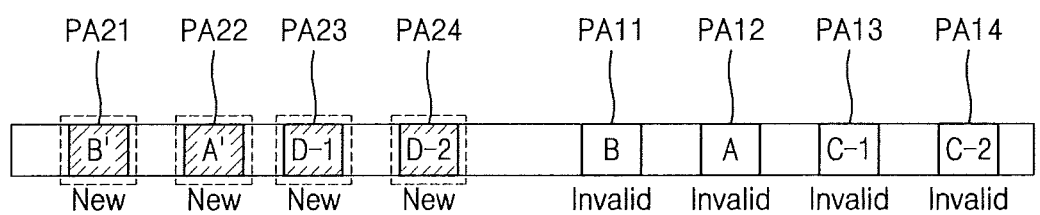
FIG. 8 is a block diagram illustrating an embodiment in which invalid data is erased in a storage system, according to some embodiments of the present inventive concepts.

FIG. 8 is a block diagram illustrating an embodiment in which invalid data is erased in a storage system, according to some embodiments of the present inventive concepts.

According to some embodiments, the secure deletion module may provide an invalid data erase command to a storage system after invalidating data of a delete-requested file. An example is illustrated in FIG. 8 as invalid data "A", "B", C-1, and C-2 of one or more files are stored at physical addresses PA12, PA11, PA13 and PA14, respectively, of a storage system and data "A", "B"), D-1, and D-2 newly mapped to logical addresses by the unmap or overwrite command are stored at physical addresses PA22, PA21, PA23 and PA24, respectively. For example, it is assumed that the data "A" of the first file and the data "B" of the second file correspond to previously invalidated data and the data C-1 and C-2 of a third file corresponds to data invalidated according to a current file delete request. Also, since the invalid data "A", "B", C-1, and C-2 have practical information of files, the invalid data "A", "B", C-1, and C-2 may correspond to data that need to be physically erased for secure deletion of the files.

The storage system may erase invalid data in various manners in response to the erase command from the secure deletion module. As an example, the secure deletion module may provide the storage system with a command instructing the storage system to erase invalid data associated with a specific file, for example, the third file. If invalid data, for example, C-1 and C-2, associated with the third file exist, the storage system may selectively erase the invalid data C-1 and C-2 of the third file located at the physical addresses PA13 and PA14, respectively, in response to the erase command from the secure deletion module.

In some embodiments, the secure deletion module may provide the storage system with an erase command instructing the storage system to erase invalid data associated with previously and currently delete-requested files. In such an embodiment, the storage system may erase invalid data of two or more deleted files in response to the unmap command or the overwrite command from the secure deletion module. As an example, in the case where data "B" of the second file and data C-1 and C-2 of the third file illustrated in FIG. 8 are invalidated according to the unmap command or the overwrite command from the secure deletion module, the storage system may selectively erase invalid data, for example, "B", of the second file located at the physical address PA11 and invalid data, for example, C-1 and C-2, located at the physical addresses PA13 and PA14, respectively, in response to the erase command from the secure deletion module.

Furthermore, in some embodiments, the storage system may include invalid data generated by any other memory operation, as well as invalid data associated with a file(s) deleted by the secure deletion module. According to some embodiments, invalid data may be generated when the storage system performs various memory operations such as a data copy operation, a swap operation, an update operation, or the like. In addition, according to some embodiments, when some files in the storage system are deleted on the OS, invalid data may be generated due to the file deleting operation on the OS.

According to some embodiments, the secure deletion module may provide an erase command on all invalid data included in the storage system, and the storage system may erase all invalid data existing therein in response to the erase command from the secure deletion module. As an example, in the embodiment in which data "B" of the second file and data C-1 and C-2 of the third file illustrated in FIG. 8 are invalidated according to the unmap command or the overwrite command from the secure deletion module and data "A" of the first file are invalidated due to any other memory operation or the file deleting operation on the OS, the storage system may erase all invalid data "A", "B", C-1, and C-2 in response to the erase command from the secure deletion module. That is, the storage system may delete all invalid data including invalid data generated in response to the secure deletion module and any other invalid data.

According to some embodiments, information of physical addresses at which the invalid data are stored may be managed through a mapping table of the storage system. Also, a value indicating information about invalidation, for example, indicating whether invalidation occurred according to a normal operation or whether invalidation occurred according to a file secure deleting operation, may be stored in the mapping table. The storage system may erase the invalid data in various manners based on the information stored in the mapping table.

Figure 9:
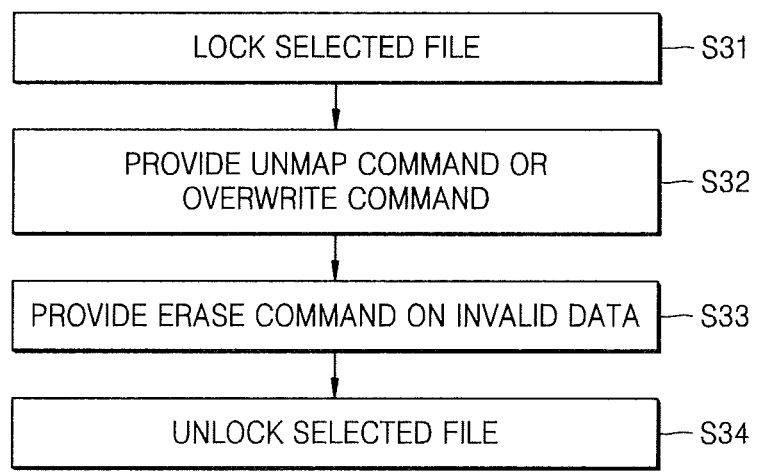
FIG. 9 is a flowchart illustrating an operating method of a host, according to some embodiments of the present inventive concepts.

FIG. 9 is a flowchart illustrating an operating method of a host, according to some embodiments of the present inventive concepts. According to some embodiments, a host may include a secure deletion module that is implemented by SW, HW, or a combination thereof. Operations illustrated in FIG. 9 will be described as being executed by the host; however, at least some of the operations may be executed by the secure deletion module.

Referring to FIG. 9, the user may provide a delete request on a specific file, for example, the first file, to the host. In an embodiment in which the secure deletion module is implemented with a separate host application, the user may execute the host application to select a file(s) to be securely deleted.

In response to the delete request from the user, the host may perform a locking operation on the first file such that a location in which the first file is stored is fixed (S31). That is, the first file is locked such that the location of the first file may not be changed. As an example, a locking command may be provided from the secure deletion module to a file system in the host. Even though a request is received from the OS or any other host application, the file system may manage the first file such that a location in which the first file is stored is fixed until a file deleting operation performed under control of the secure deletion module is completed. The locking operation may be performed by setting a specific value of a flag of metadata of the first file to a given value. As such, it is possible to prevent a file which the user does not want to delete from being deleted due to the change of a file location.

The host may perform the file deleting operation according to the above-described embodiment while the location in which the first file is stored is fixed. As an example, the host may provide the unmap command to invalidate a file or the overwrite command to invalidate a file to the storage system based on whether it is possible to obtain information of a region at which the first file is located from the file system (S32). As an example, if the region information is obtained from the file system, the host may provide the unmap command to the storage system to invalidate data of the first file. If the region information is not obtained from the file system, the host may provide the storage system with the overwrite command to invalidate data of the first file instructing the storage system to overwrite random data on the data of the first file. Here, the size of the random data may be the same as the size of the existing data of the first file.

After the unmap command or the overwrite command is performed by the storage system, according to the above-described embodiments, the host may provide the storage system with the erase command instructing the storage system to erase invalid data (S33). In some embodiments, the storage system may selectively erase only invalid data corresponding to the first file, according to the above-described embodiments. In some embodiments, the storage system may simultaneously erase invalid data of two or more files that are delete-requested through the OS and the secure deletion module, as described above. In some embodiments, the storage system may perform an erase operation on all invalid data existing therein, as described above.

When the file secure deleting operation independent of the OS is completed, the host may unlock the first file (S34). After the first file is unlocked, the first file may be deleted on the OS.

Figure 10:
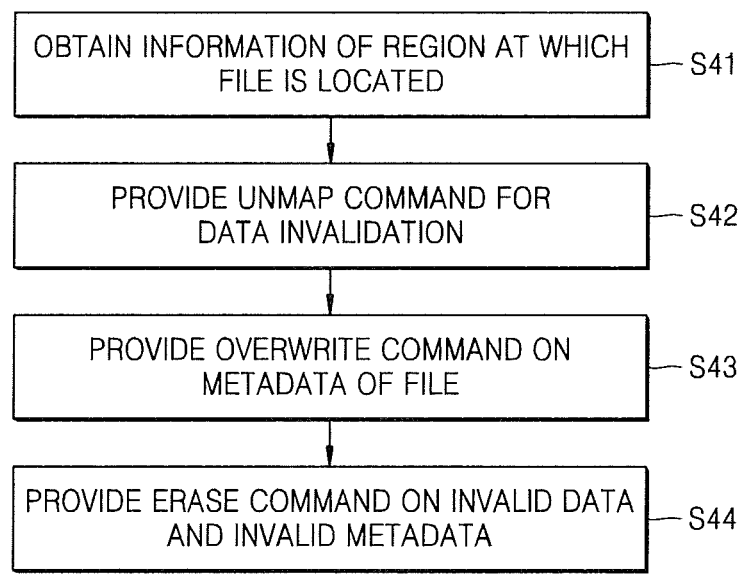
FIG. 10 is a flowchart and FIG. 11 is a block diagram illustrating an embodiment in which a file deleting operation includes changing metadata including a file name, according to some embodiments of the present inventive concepts.
Figure 11:
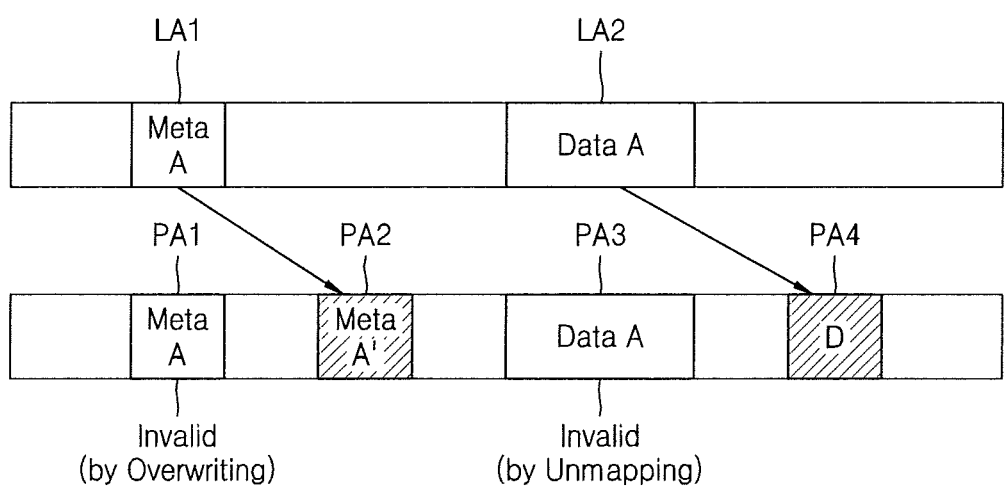

FIG. 10 is a conceptual diagram and FIG. 11 is a block diagram illustrating an embodiment in which a file deleting operation includes changing metadata including a file name. In describing operations illustrated in FIGS. 10 and 11, operations that are the same as or similar to those described in the above embodiments will not be described.

Referring to FIGS. 10 and 11, as a host (or the secure deletion module) receives a delete request on a first file from a user, a series of operations for invalidating data of the first file may be performed according to the above-described embodiments. For example, the host may obtain information of a region at which the delete-requested first file is located (S41), that is, the logical address, and may provide the unmap command for invalidating the data of the first file (S42). However, if the logical address is not obtained from the storage system, the overwrite command for overwriting random data on the data of the first file may be provided to the storage system.

Metadata of the first file may include critical information of the user. As an example, the metadata of the first file may include information about a file name of the first file, and the file name of the first file also needs to be erased for secure deletion of the first file.

The host may invalidate the metadata of the first file to delete the file name of the first file. As an example, if a logical address of a region at which the metadata of the first file is located is not obtained, the host may provide the overwrite command for overwriting random data on the metadata of the first file (S43). As an example, the file name of the metadata or the entirety of the metadata may be overwritten with random data. Accordingly, the file name may not be recovered from the overwritten metadata.

The existing data and metadata of the first file may be invalidated according to the above-described operations. The host may provide the storage system with the erase command instructing the storage system to erase the invalidated data and the invalidated metadata (S44). As such, the critical information such as the file name of the first file may be securely deleted together with practical contents, for example, user data, of the first file.

Referring to FIG. 11, as a logical address corresponding to the data Data A of the first file is obtained, the data Data A of the first file may be invalidated according to the above-described unmap command. For example, the data Data A may be stored at a physical address PA3 previously mapped to a logical address LA2, but the mapping relationship between the logical address LA2 and the physical address PA3 may be released. The data Data A stored at physical address PA3 may be invalidated by the above described unmapping. According to some embodiments, the logical address LA2 may be newly mapped to a physical address PA4 at which random data, for example, dummy data "D", is stored.

In such an embodiment, at least part of the metadata Meta A of the first file may be invalidated according to the above-described overwrite command. As an example, if random data is overwritten on the existing metadata Meta A stored at the physical address PA1 previously mapped to a logical address LA1, the overwritten metadata Meta A' may be stored at a location corresponding to a different physical address PA2, and the existing metadata Meta A stored at the physical address PA1 may be invalidated. That is, the metadata Meta A stored at physical address PA1 previously mapped to logical address LA1 may be invalidated by overwriting and the logical address LA1 may be newly mapped to the physical address PA2 at which the overwritten metadata Meta A' is stored. After the above-described invalidation is completed, the invalidated data may be erased based on a command of the host.

Figure 12:
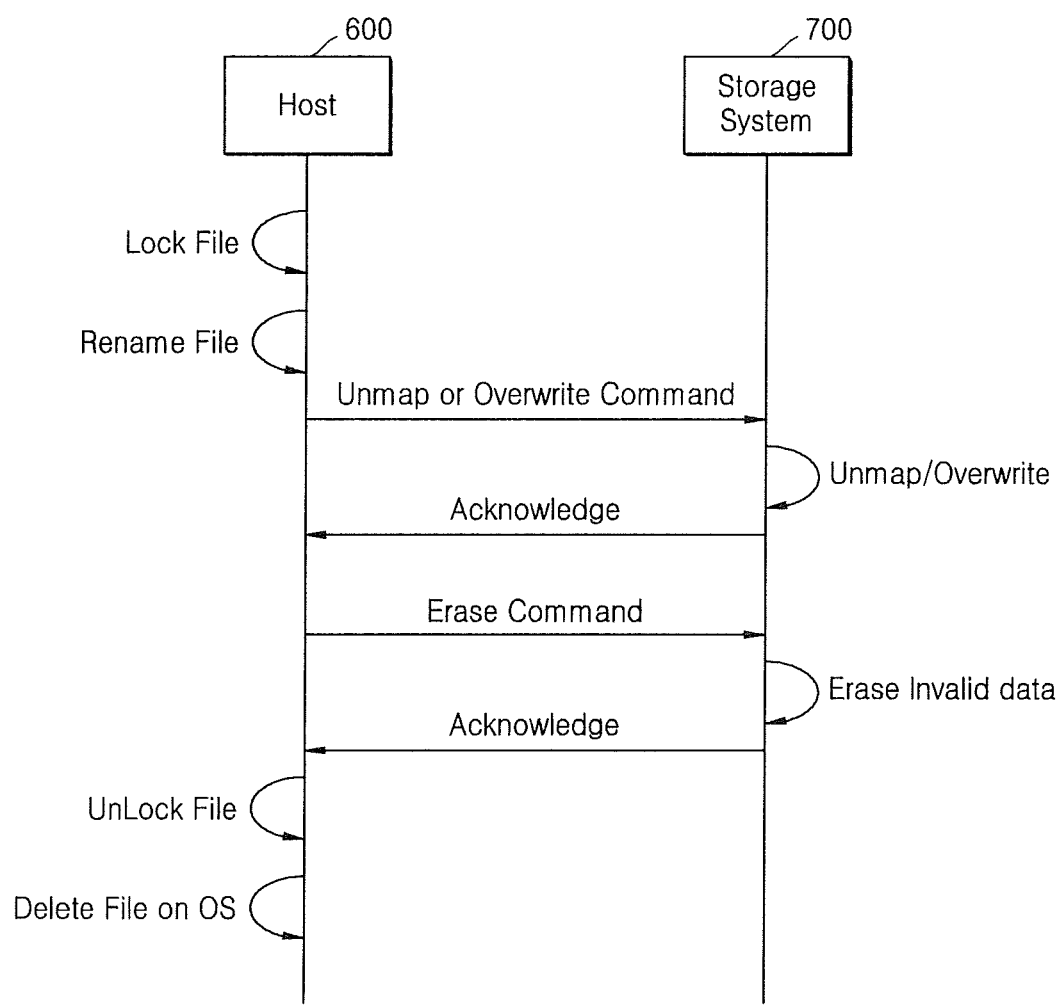
FIG. 12 is a conceptual diagram illustrating operations of a host and a storage system associated with file secure deletion in a computing system, according to some embodiments of the present inventive concepts.

FIG. 12 is a conceptual diagram illustrating operations of a host and a storage system associated with file secure deletion in a computing system, according to some embodiments of the present inventive concepts.

Referring to FIG. 12, a host 600 may lock a file corresponding to a file secure delete request of the user. A series of operations for securely deleting the file may be performed while the file is locked. For example, a file name may be changed by the host 600 by performing the overwrite operation on metadata of the file.

The host 600 may also perform an operation of invalidating data of the locked file. As an example, the host 600 may provide the unmap command or the overwrite command on the data of the file to the storage system 700. The storage system 700 may invalidate the data of the locked file by performing an operation corresponding to the unmap command or the overwrite command, for example, as described above with regard to the previous embodiments. Also, when the unmap or overwrite operation is completed, the storage system 700 may provide the host with a response signal Acknowledge indicating that the data invalidating operation is completed.

The host 600 may provide the storage system 700 with the erase command for erasing the invalidated data, and the storage system 700 may provide the response signal Acknowledge to the host after erasing the invalid data. Information about invalid data, for example, information about a logical address and/or a physical address at which invalid data is located, may be managed in the storage system 700. In some embodiments the storage system 700 may selectively erase only invalid data of a file selected by the user in response to the erase command from the host 600. In other embodiments, the storage system 700 may further erase invalid data of other files existing therein in addition to the file selected by the user in response to the erase command from the host 600.

When the file secure deleting operation is completed, the file may be unlocked by the host 600, and the unlocked file may be again deleted on the OS. In such an embodiment, the file to be deleted on the OS may correspond to a file of which the file name or contents are in advance changed by the above-described file secure delete function. For this reason, even though an interval in which file deletion is not made on the OS exists, it may be impossible to recover original information of the file. That is, even though an interval in which file deletion is not made on the OS exists, the original file has been independently deleted by the secure deletion module and, as a result, the original file may not be recovered.

Figure 13A:
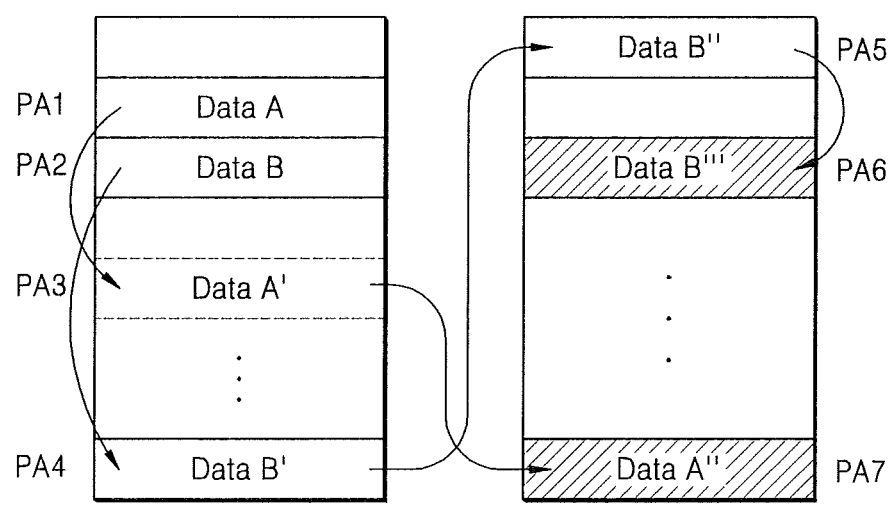

FIG. 13A is a conceptual diagram and FIG. 13B is a table illustrating an embodiment of an erase operation performed on invalid data in a storage system, according to some embodiments of the present inventive concepts. That is, an example of an erase operation using a history table of a file is illustrated in FIGS. 13A and 13B.

Referring to FIGS. 13A and 13B, data, for example, the user data Data A, of the first file may be stored in a region corresponding to the first physical address PA1, and data, for example, the user data Data B, of the second file may be stored in a region corresponding to the second physical address PA2. Locations at which the data Data A and Data B of the first and second files are physically stored may be changed through various memory operations. As an example, in the embodiment in which contents of the data Data A and Data B of the first and second files are changed, the changed data may be stored in a region corresponding to a new physical address, and existing data may be invalidated.

As an example, as the data Data A of the first file are changed, the data Data A of the first file may be moved to a third physical address PA3 and then moved to a seventh physical address PA7. Also, as the data Data B of the second file are changed, the data Data B of the second file may be moved to fourth and fifth physical addresses PA4 and PA5 and then moved to a sixth physical address PA6. In such an embodiment, data Data A" stored at the seventh physical address PA7 may correspond to valid data of the first file, and data Data A and Data A' respectively stored at the first and third physical addresses PA1 and PA3, respectively, may correspond to invalid data. In a similar manner, data Data B'" stored at the sixth physical address PA6 may correspond to valid data of the second file, and data Data B, Data B', and Data B" respectively stored at the second physical address PA2, fourth physical address PA4, and fifth physical address PA5, respectively, may correspond to invalid data. According to some embodiments, each of the valid data Data A" of the first file and the valid data Data B'" of the second file may correspond to random data, for example, dummy data or overwritten data, irrelevant to information of the file corresponding to each valid data.

If an invalid data erase command is provided from the host to the storage system, the storage system may selectively find only invalid data of a file and may erase the found invalid data. If the erase command to erase invalid data of the first file is provided from the host to the storage system, the storage system may erase the invalid data Data A and Data A' of the first and third physical addresses PA1 and PA3. Alternatively, in the embodiment in which the erase command from the host corresponds to an erase command to erase a plurality of files, the storage system may erase the invalid data Data A and Data A' of the first and third physical addresses PA1 and PA3, respectively, and the invalid data Data B, Data B', and Data B" of the second, fourth, and fifth physical addresses PA2, PA4, and PA5, respectively.

FIG. 13B is a table illustrating an example of a history table for managing the above-described invalid data erasing operation. The storage system may include the history table therein and may determine locations of invalid data associated with files by managing a history of data of each file moved. Like the above-described embodiment, a logical address that is determined by a host and indicates a logical location of the first file may correspond to the first logical address LA1, and the first logical address LA1 may be mapped to the seventh physical address PA7 at which valid data of the first file is stored. A logical address that is determined by the host and indicates a logical location of the second file may correspond to the second logical address LA2, and the second logical address LA2 may be mapped to the sixth physical address PA6 at which valid data of the second file is stored. Information indicating that data stored at the physical addresses PA6 and PA7 are valid may be included in the history table.

Information of the physical addresses PA1 and PA3 previously mapped to the first logical address LA1 in connection with the first file may be included in the history table, and information indicating that data stored at the physical addresses PA1 and PA3 are invalid may be included in the history table. Information of the physical addresses PA2, PA4, and PA5 previously mapped to the second logical address LA2 in connection with the second file may be included in the history table, and information indicating that data stored at the physical addresses PA2, PA4, and PA5 are invalid may be included in the history table. The storage system may erase invalid data in various manners, based on the information stored in the history table.

Figure 14:
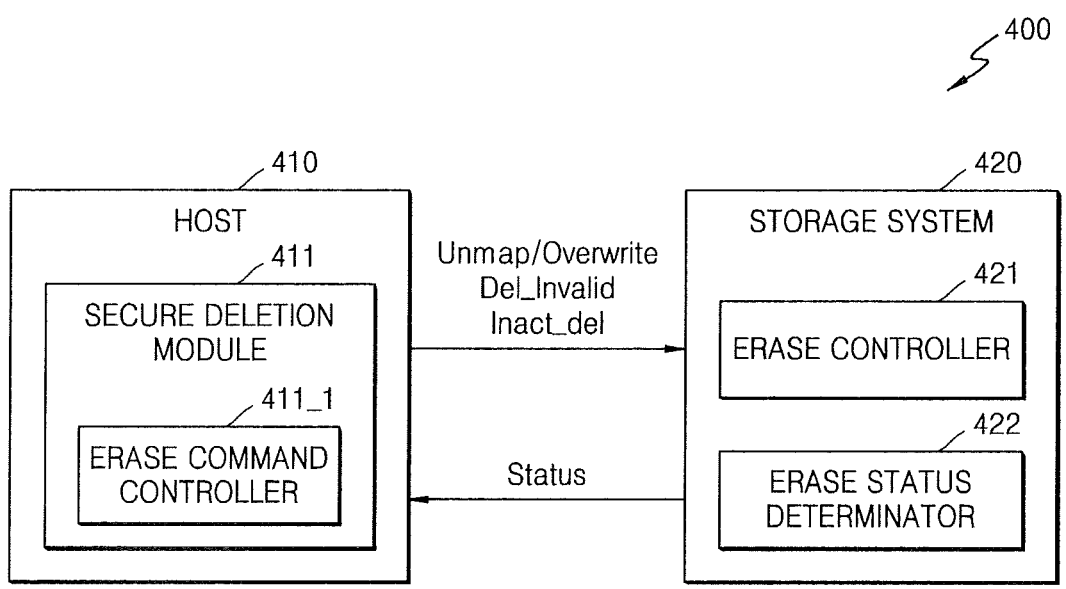
FIG. 14 is a block diagram illustrating a computing system according to some embodiments of the present inventive concepts.

FIG. 14 is a block diagram illustrating a computing system according to some embodiments of the present inventive concepts.

Referring to FIG. 14, a computing system 400 may include a host 410 and a storage system 420. The storage system 420 may include an erase controller 421 and an erase status determinator 422. The erase status determinator 422 may determine an erase processing status of invalid data in the storage system 420. As an example, the erase status determinator 422 may generate a determination result indicating a ratio of invalid data which is erase-completed to the whole invalid data to be erased or may generate a result of determining a time needed for an erase operation. The erase status determinator 422 may provide the result Status of determining the erase processing status to the host 410. The erase controller 421 in the storage system 420 may perform an operation of erasing invalid data in response to an erase command Del_Invalid from the host 410.

As described in the above embodiments, the host 410 may include a secure deletion module 411. The secure deletion module 411 may include an erase command controller 411_1. The secure deletion module 411 may provide the unmap command Unmap or the overwrite command Overwrite to the storage system 420 to invalidate data of a file corresponding to a secure deletion target, as described in the above embodiments. After invalidating the data, the secure deletion module 411 may provide the storage system 420 with the erase command Del_Invalid for erasing invalid data.

The erase command controller 411_1 may control an operation of the secure deletion module 411 outputting the erase command Del_Invalid. As an example, after the data of the file corresponding to the secure deletion target is completely invalidated under control of the secure deletion module 411, the erase command controller 411_1 may control the secure deletion module 411 such that the erase command Del_Invalid is provided to the storage system 420. On the basis of the determination result Status from the storage system 420, the erase command controller 411_1 may control the secure deletion module 411 such that an inactive control signal Inact_del for inactivating the erase operation of the storage system 420 is provided to the storage system 420.

An invalid data erasing operation may be controlled according to the determination result Status in various manners. As an example, when the host needs a data access to the storage system 420, the erase command controller 411_1 may determine whether to inactivate the invalid data erasing operation with reference to the determination result Status. For example, in the embodiment in which a time needed for the erase operation is greater than a threshold value, the inactive control signal Inact_del may be provided to the storage system 420 under control of the erase command controller 411_1. In such an embodiment, the host 410 may provide a data access request to the storage system 420 while the erase operation is inactivated. When the data access that the host 410 needs is completed, the erase command controller 411_1 may no longer be provided to the storage system 420 and the erase command Del_Invalid may be again provided to the storage system 420 from the host 410. As a result, the erase operation may be performed again.

According to the embodiments of the present inventive concepts, a storage system (or a controller) may include firmware such that a deletion operation is performed according to a command from a secure deletion module of a host. The firmware may be embodied as software or a program, and may be stored or loaded in a memory in the storage system.

The storage system may receive a command associated with file deletion from the secure deletion module of the host, and may receive a command associated with file deletion from an OS of the host. For example, the storage system may receive a first type of erase command from the secure deletion module or receive a second type of erase command from the OS. Also, the storage system may distinguish between the first type of erase command and the second type of erase command. A first deletion operation may be performed on a first file under the control of the secure deletion module in response to an erasure command of the first type from the secure deletion module. After the first deletion operation is completed, a second deletion operation may be performed on the first file under the control of the OS in response to an erasure command of the second type from the OS. The first deletion operation may include invalidation of data of the first file in response to the command from the secure deletion module and erasure of the invalid data of the first file by referring the history table in response to the erasure command of the first type from the secure deletion module The storage system may perform different erase operations according to the distinguished erase command. For example, when a time period related to erasure is set in the storage system and the first type of erase command is received, the erase operation is performed within the set time period.

Also, when the first type of erase command is received, invalid data of a plurality of files may also be erased by checking the history table, as described in connection with FIGS. 13A and 13B. The storage system may selectively refer to the history table by determining the erasure command of the first type or the erasure command of the second type. Also, a plurality of pieces of invalid data corresponding to one file may be erased all together by checking the history table. The history table may store information associated with invalid data of a plurality of files, and, when the erasure command of the first type is received, invalid data of at least two files of the plurality of files may be erased together. The history table may store information associated with two or more pieces of invalid data corresponding to a first file, and, when the erasure command of the first type is received, all the invalid data corresponding to the first file may be erased.

In some embodiments, when an erasure command from the OS is received for a second file, the second deletion operation may be selectively performed on the second file without performing the first deletion operation under the control of the secure deletion module.

Figure 15:
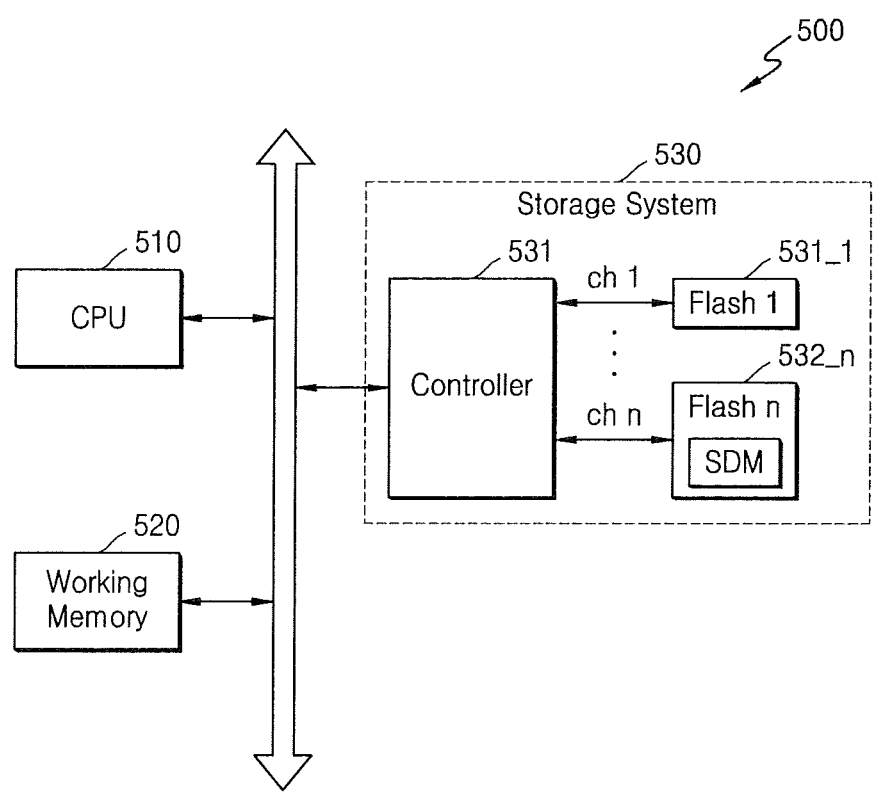
FIG. 15 is a block diagram illustrating an embodiment in which various kinds of storage systems are applied a computing system, according to some embodiments of the present inventive concepts.

FIG. 15 is a block diagram illustrating an example in which various kinds of storage systems are applied to a computing system, according to some embodiments of the present inventive concepts.

Referring to FIG. 15, a computing system 500 may be various kinds of systems on which a storage system 530 storing data nonvolatilely may be mounted. As an example, the computing system 500 may correspond to various kinds of systems such as a computer, a net-book, a web tablet, a wireless phone, a mobile phone, a smartphone, an e-book, a navigation device, a digital camera, or the like.

The computing system 500 may include a CPU 510, a working memory 520, and the storage system 530. The storage system 530 may be various kinds of memory systems storing data nonvolatilely. As an example, the storage system 530 may be a memory card system including one or more flash memory chips. For example, a compact flash card (CFC), a universal flash storage (UFS) card, a microdrive, a smart media card (SMC), a multimedia card (MMC), a security digital card (SDC), a memory stick, a universal serial bus (USB) flash memory driver, or the like, may be applied to the storage system 530.

Alternatively, the storage system 530 may correspond to a SSD system. The storage system 530 may include a plurality of memory chips 532_1 to 532_n that are connected to a controller 531 through a plurality of channels ch 1 to ch n, respectively.

According to some embodiments, the secure deletion module SDM may be implemented by software and may be stored in the storage system 530. That is, the storage system 530 may correspond to a storage medium that stores SW for performing a file secure deletion function according to the above-described embodiments.

The storage system 530 may be mounted on the computing system 500, and the secure deletion module SDM stored in the storage system 530 may be loaded to the working memory 520 as electric power is applied to the computing system 500. The computing system 500 may execute various applications, for example, the host application, and may also perform a data access operation to the storage system 530. Also, if the user provides a file secure delete request, the secure deletion module SDM loaded to the working memory may be executed such that an SDM-based file deleting operation according to the above-described embodiments is performed. For example, data of a file may be invalidated according to the unmap command or the overwrite command from the secure deletion module SDM, and invalid data may be physically erased according to an invalid data erase command from the secure deletion module SDM. Also, if the SDM-based file deleting operation is completed, the file deleting operation may be performed on the OS installed in the computing system 500.

Although a few embodiments of the present general inventive concepts have been shown and described, it will be appreciated by those skilled in the art that changes may be made in these embodiments without departing from the principles and spirit of the general inventive concepts, the scope of which is defined in the appended claims and their equivalents.

What is claimed is:

1. An operating method of a host, the method comprising:
receiving a request for secure deletion of a first file stored in a storage system;
providing an invalidation command to the storage system for invalidating data of the first file;
providing an erase command to the storage system for erasing invalidated data included in the storage system including the invalidated data of the first file and erasing the invalidated data included in the storage system including the invalidated data of the first file by providing the erase command; and
performing a deletion operation, which is executable on an operating system of the host, on the first file after the erasing of the invalidated data by providing the erase command.

2. The method of claim 1, wherein a secure deletion module is installed in the host, and
wherein the request for secure deletion is received through the secure deletion module.

3. The method of claim 1, wherein providing the invalidation command to the storage system comprises:
providing an unmap command to the storage system for unmapping the data of the first file.

4. The method of claim 1, wherein the providing the invalidation command to the storage system comprises:
providing an overwrite command to the storage system for overwriting the data of the first file.

5. The method of claim 1, further comprising:
determining whether a logical address, at which the first file is located, has been obtained from a file system included in the host,
wherein if the logical address has been obtained, the providing the invalidation command to the storage system comprises providing an unmap command to the storage system for unmapping the data of the first file, and
wherein if the logical address has not been obtained, the providing the invalidation command to the storage system comprises providing an overwrite command to the storage system for overwriting the data of the first file.

6. The method of claim 1, further comprising:
when the request for secure deletion is received, locking the first file, wherein the locking includes fixing a location of the first file; and
unlocking the first file after erasing invalidated data in the storage system performed in response to the erase command is completed.

7. The method of claim 1, further comprising:
providing an invalidation command to the storage system for invalidating metadata of the first file.

8. The method of claim 7, wherein the invalidation command for invalidating the metadata of the first file includes an overwrite command for overwriting a file name included in the metadata of the first file with random data.

9. The method of claim 1, wherein the erase command includes a command for erasing one or more pieces of invalid data associated with the first file.

10. The method of claim 1, wherein the erase command includes a command for simultaneously erasing the invalid data of the first file and invalid data of at least one other file.

11. The method of claim 1, wherein the performing of the deletion operation on the first file comprises:

performing the deletion operation on the first file again after information of the first file is unrecoverably changed according to the invalidation command and the erase command.

12. The method of claim 1, further comprising:
receiving status information indicating an erase status of invalid data included in the storage system; and
providing a control signal for deactivating the erasing of invalidated data of the storage system based on checking the status information.

13. An operating method of a host, the method comprising:
receiving a request to delete a first file included in a storage system through a secure deletion module supporting a secure deletion function;
providing one of an unmap command and an overwrite command to the storage system in response to the request, for unmapping or overwriting data in the first file independently of an operating system installed in the host;
providing an erase command to the storage system for erasing data invalidated according to the one of the unmap command and the overwrite command and erasing the data invalidated according to the one of the unmap command and the overwrite command by providing the erase command; and
performing an operation by the operating system deleting the first file,
wherein the erasing the data invalidated according to the one of the unmap command and the overwrite command by providing the erase command is performed before the operation by the operating system deleting the first file starts.

14. A storage system that communicates with a host, the storage system comprising:
a memory device configured to store data and metadata of one or more files; and
a controller configured to control a data access operation of the memory device,
wherein the storage system includes a history table configured to store information associated with invalid data of the one or more files,
wherein the controller is further configured to perform a first deletion operation on a first file in response to a first request from a secure deletion module in the host and a second deletion operation on the first file in response to a second request from an operating system in the host after the first deletion operation is completed, and
wherein the first deletion operation includes invalidation of data of the first file in response to a command from the secure deletion module and erasure of the invalid data of the first file by referring to the history table in response to an erasure command of a first type from the secure deletion module.

15. The storage system of claim 14, wherein the storage system stores programs for implementing the secure deletion module, and
wherein the secure deletion module is provided to the host upon initial driving of the storage system.

16. The storage system of claim 14, wherein the second deletion operation includes erasure of the invalid data of the first file in response to an erasure command of a second type from the operating system, and
wherein the controller is further configured to selectively refer to the history table by determining the erasure command of the first type or the erasure command of the second type.

17. The storage system of claim 14, wherein information about a time period associated with the erasure of the invalid data is set in the controller, and wherein the controller is further configured to complete the erasure of the invalid data within the set time period in response to the erasure command of the first type.

18. The storage system of claim 14, wherein the history table stores information associated with invalid data of a plurality of files, and
wherein, when the erasure command of the first type is received, the controller is configured to erase invalid data of at least two files together, from among the plurality of files.

19. The storage system of claim 14, wherein the history table stores information associated with two or more pieces of invalid data corresponding to the first file, and
wherein, when the erasure command of the first type is received, the controller is further configured to erase all the invalid data corresponding to the first file.

20. The storage system of claim 14, wherein, when an erasure command from the operating system is received for a second file, the controller is configured to selectively perform the second deletion operation on the second file without performing the first deletion operation.

* * * * *